Aug. 14, 1928.

G. H. BUGENHAGEN 1,680,591

AUTOMATIC CONTROL VALVE

Filed March 24, 1927  2 Sheets-Sheet 1

INVENTOR
G. H. Bugenhagen
BY
ATTORNEY

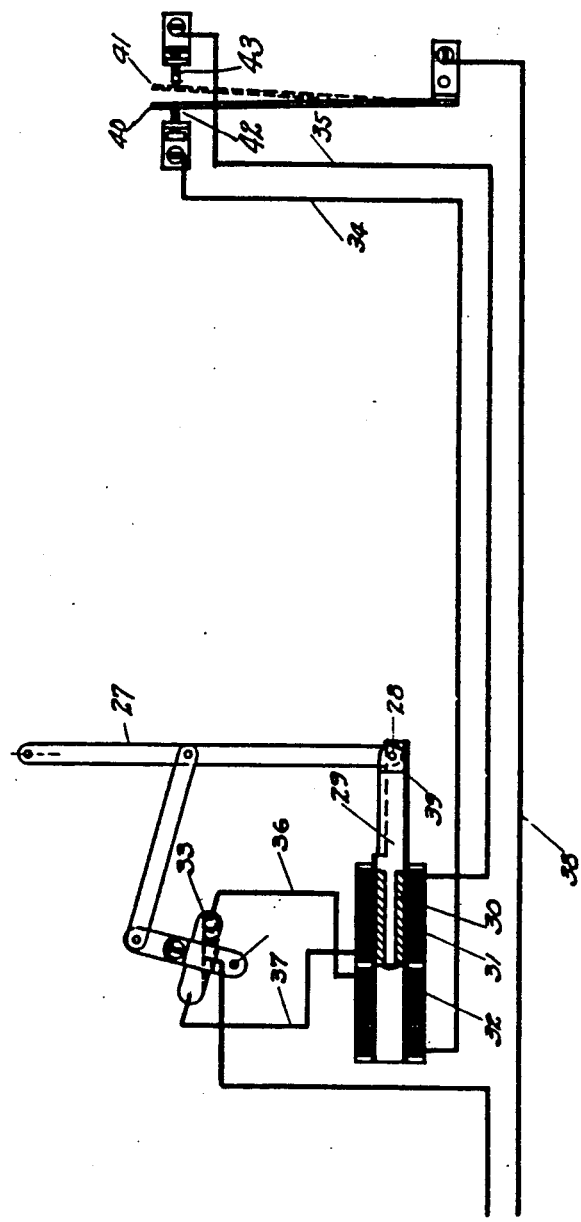

Patented Aug. 14, 1928.

1,680,591

UNITED STATES PATENT OFFICE.

GEORGE H. BUGENHAGEN, OF MINOT, NORTH DAKOTA.

AUTOMATIC CONTROL VALVE.

Application filed March 24, 1927. Serial No. 177,986.

My invention relates to improvements in automatic control valves. The object of my improvements are; First, to provide a thermostatic controlled control valve for radiators, such as used in heating buildings, simple in construction and adaptable in that one or more installations can easily be made. Second, to provide a valve that receives its power to operate from the heat used in the radiator. Third, to provide a control valve so simple that expert mechanics are not necessary in its installation.

I attain these objects by the mechanism illustrated in the accompanying drawings, in which.

Similar numerals refer to similar parts, throuout the several views.

Figures 1, 2, 3:
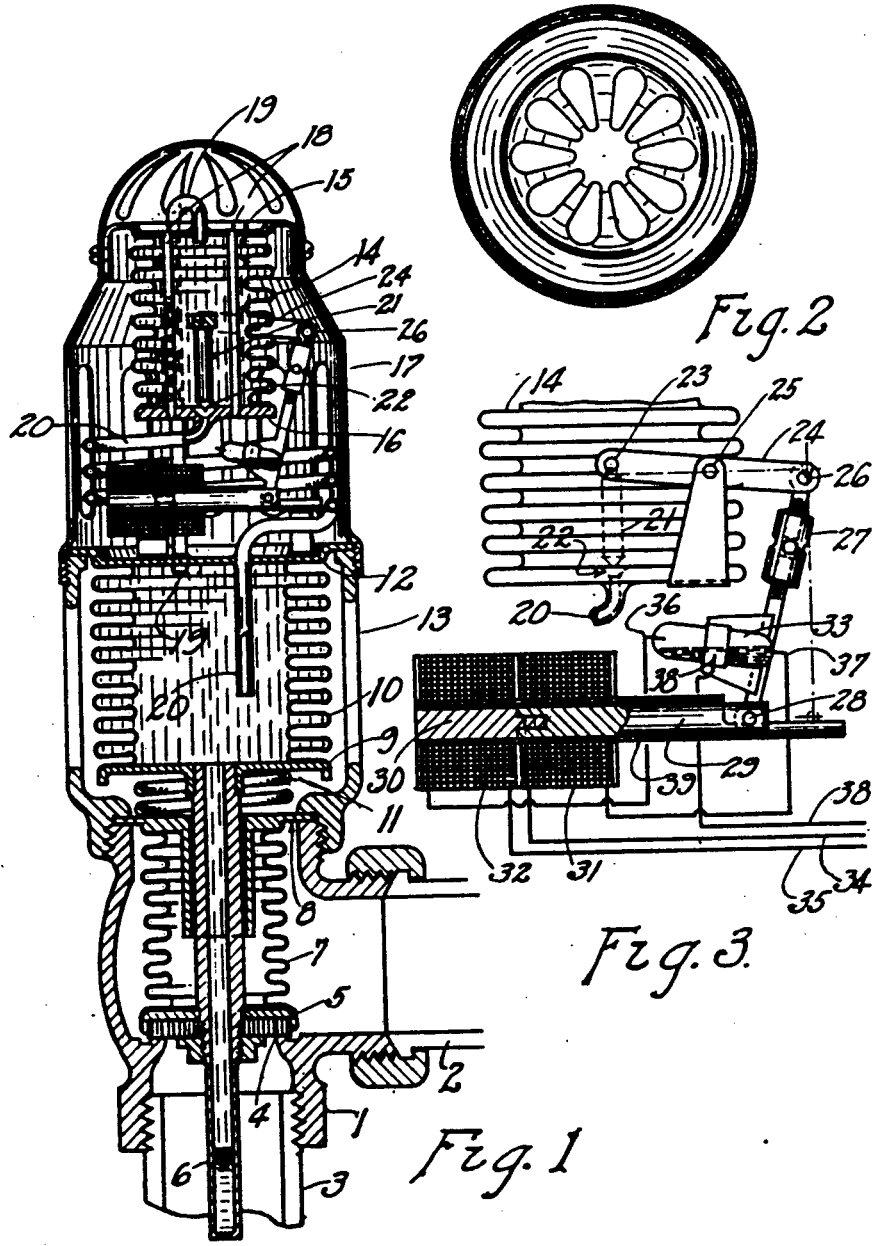
Fig. 1 is a cross section of the entire assembly.
Fig. 2 is a plan view and Fig. 3 an enlarged view and partial section, showing the solenoids and switch, with mechanism to operate the governing valve in its control of the automatic control valve.

The parts 1—13—17 constitute the body and housing of the valve to which is connected a nipple 2, and union leading to a radiator. 3 is a supply pipe for steam or hot water supplied to the valve.

The valve seat 4 is provided with a valve disc 5 and removably fixed to the valve stem 6. The valve stem 6 is sealed in its movements by the flexible metallic bellows 7 fixed and sealed at its free end to the valve disc 5 and at the fixed end to a guide disc 8, thus preventing the escape of steam or the letting in of air under a vacuum. To the upper end of valve stem 6 is connected a power motor metallic bellows 10 by means of a disc 9 fixed and sealed to bellows 10 and the valve stem 6, the fixed end of bellows 10 is fixed and sealed to disc 12, which is removably connected between the body parts 13—17 as shown. Between the disc 8 and 9 is positioned a compression spring 11 for the purpose of lifting the valve disc 5 from the seat 4 when the pressure within the bellows 10 subsides.

The flexible bellows reservoir 14 has the upper end fixed and sealed to a disc 15 and said disc 15 is fixed to the housing 17. The lower end of bellows 14 is fixed and sealed to disc 16, said disc has a valve seat 22 and is stayed in a fixed position to the disc 15 by the two stay rods 18 as shown. The valve seat 22 is provided with a spiral duct 20 leading downward to the power motor bellows end 12 and extends downward into the compartment within the bellows 10 and is a securely sealed connection to the disc 12. A second duct 19 leads from the upper disc 15 with a sealed connection thereto and downward into the power motor bellows disc end 12 and sealed thereto. The governing valve stem 21 is in alignment with valve seat 22 and has a cross bar 23 with pivoted ends fixed and sealed where it extends thru the walls of bellows 14. The rocker arm 24 is operative on the fixed center 25 and actuated by the toggle 27 pivotally connected thereto by 26 and pivotally connected to piston 29 by the axle pin 28, said piston movably mounted in the guide 39 and actuated by electrical force in the solenoid coils 31 and 32 respectively, as effected by the mercury switch 33; said switch breaking circuit at 36 in the position shown in Fig. 3 and at 37 when the toggle 27 is in a vertical position as shown in Fig. 4. The circuit 38 being the hot wire and wires 34—35 the control circuits from a thermostat used in connection with the valve. Referring to Fig. 3, when the thermostat closes the circuit for wire 34 the solenoid 31 is magnetized and core 30 is drawn outward into the magnetized field 31 causing piston 29 to force the rocker arm upward and the valve 21 firmly into the valve seat 22 and at the same time reverse the angle of tilt for the mercury switch 33 as shown in Fig. 4 so that circuit 37 will be broken and 36 in contact ready for the reversal when the thermostat contact is made in circuit 35.

Referring to Fig. 4, the thermostat element 40 is affected by temperature changes so that it moves laterally to the position shown by dotted lines 41, thus making contact with the terminals 42—43 for the wires 34—35 respectively as shown. The desired temperature difference between the extreme low and high is fixed by the adjustment of contact points 42—43.

A volatile liquid with a boiling point preferably less than that of water, and in sufficient quantity to produce the required pressure is sealed within the bellows 10, 14 and the communicating ducts and when vaporized or boiled causes a pressure within the power motor bellows 10 and forces the valve disc 5 down tight to the valve seat 4.

In operation, the drawing shows the automatic control valve closed; in this position the volatile liquid has been converted into a steam or vapor in the generating tube 6, now surrounded by live steam. A pressure is exerted against the lower end of the bellows 10 and conveyed by the valve stem to the valve seat 4. To open the valve, the thermostat makes contact on the terminal of wire 34, the solenoid 31 is magnetized and the governing valve 22 is closed. With the volatile liquid vapor confined in the reservoir 14 as well as in 10, the vapor condenses as it cools. The valve 22 being closed the liquid is trapped and its return to the generating tube 6 prevented. Thus, with a constant lessening of vaporized volatile liquid as it accumulates in the trap, pressure is gradually reduced and the valve is correspondingly opened by the force of the compression spring 11, until all volatile liquid is trapped and the valve fully opened. When the thermostat makes contact of the terminal for wire 35, the governing valve 22 is opened again, the volatile liquid allowed to flow down into the generating tube and there again generated into steam, causing the valve to close as before. The valve normally remains open for all room temperatures below the maximum temperature desired, closing only when the room temperature exceeds the maximum.

I am aware that automatic control valves operated with compressed air, are on the market, but not to my knowledge is my combination used and I therefore claim as follows;

1. The combination in an automatic control valve, a hollow valve stem generating tube, a power motor consisting of a flexible metallic bellows, sealed within said bellows a volatile liquid, free end of said bellows connected to valve stem, with a flexible metallic reservoir positioned above and apart from said power motor bellows, a governing valve positioned within said reserve and operative by means outside of the said reservoir. The reservoir connected to motor bellows by a spiral heat eliminating duct and condensation return, leading from valve seat in reservoir to motor bellows and a secondary duct leading from motor bellows into the top of the reservoir.

2. The combination in an automatic control valve, a hollow valve stem generating tube, connected to said tube a power motor bellows and sealed within said power motor bellows a volatile liquid, a reservoir with a governing valve within, positioned above the power motor and ducts leading from the valve seat in the reservoir and also from the top of the reservoir down to the power motor bellows, with an electric control mechanism consisting of two independently operated solenoids surrounding a metallic piston, said solenoids controlled by a mercury switch, and means for operating the aforesaid governing valve within the reservoir, all substantially as set forth.

3. The combination in an automatic control valve, with a valve sealed by a flexible metallic bellows and means for closing said valve by power generated from the heat supplied to the radiator, means containing a volatile liquid in a hermetically sealed flexible power motor bellows, the free end of which being attached to valve and operated therewith, means for bringing the volatile liquid in contact with the heat supply to the radiator and to convert said volatile liquid into vapor. Means for condensing said vapor and trapping the condensation thereof in a container above and apart from the power motor with ducts leading to said motor, means electrically operated for opening and closing the valve in said trap to release or retain the volatile liquid, and operation thereof subject to the thermostat control, means to break the current incidental to operation in opening or closing of governing valve as soon as operation thereof is completed.

GEORGE H. BUGENHAGEN.